(12) United States Patent
Michalak et al.

(10) Patent No.: US 7,201,434 B1
(45) Date of Patent: Apr. 10, 2007

(54) ENERGY-ABSORBING BOLSTER FOR AN AUTOMOTIVE INSTRUMENT PANEL ASSEMBLY

(75) Inventors: Robert J. Michalak, Clinton Township, MI (US); Gary T. Feger, Clinton Township, MI (US)

(73) Assignee: Cadence Innovation LLC, Sterling Heights, MI (US)

( * ) Notice: Subject to any disclaimer, the term of this patent is extended or adjusted under 35 U.S.C. 154(b) by 0 days.

(21) Appl. No.: 11/267,222

(22) Filed: Nov. 4, 2005

(51) Int. Cl.
*B60J 7/00* (2006.01)

(52) U.S. Cl. .................... 296/187.05; 296/70; 280/752

(58) Field of Classification Search ........... 296/187.05, 296/70; 280/748, 752
See application file for complete search history.

(56) References Cited

U.S. PATENT DOCUMENTS

| | | | |
|---|---|---|---|
| 3,930,665 A * | 1/1976 | Ikawa ......................... 296/70 |
| 3,933,387 A * | 1/1976 | Salloum et al. ............. 293/120 |
| 5,311,960 A | 5/1994 | Kukainis et al. |
| 5,326,130 A | 7/1994 | Gedeon et al. |
| 5,431,442 A * | 7/1995 | Tomita et al. ............... 280/748 |
| 5,527,084 A * | 6/1996 | Scherf .................... 296/187.05 |
| 5,795,013 A * | 8/1998 | Keller et al. ........... 296/187.05 |
| 5,992,924 A * | 11/1999 | Noritake et al. ....... 296/187.05 |
| 6,012,764 A * | 1/2000 | Seksaria et al. ....... 296/187.05 |
| 6,068,320 A * | 5/2000 | Miyano ................. 296/187.05 |
| 6,199,942 B1 | 3/2001 | Carroll, III et al. |
| 6,244,626 B1 * | 6/2001 | Monaghan et al. ......... 280/805 |
| 6,364,359 B1 * | 4/2002 | Dietrich ................... 280/801.2 |
| 6,454,305 B1 * | 9/2002 | Prottengeier ................ 280/751 |
| 6,464,255 B1 | 10/2002 | Preisler et al. |
| 6,474,687 B2 | 11/2002 | Cappabianca et al. |
| 6,631,920 B1 * | 10/2003 | Webber et al. .............. 280/752 |
| 6,733,064 B2 * | 5/2004 | Fox et al. ............. 296/187.05 |
| 6,786,524 B2 * | 9/2004 | Tamura ........................ 296/70 |
| 6,797,089 B2 | 9/2004 | Brahm et al. |
| 6,863,329 B2 * | 3/2005 | Fero .......................... 296/37.8 |
| 6,869,123 B2 | 3/2005 | Marks et al. |
| 2005/0052010 A1 | 3/2005 | Best et al. |
| 2005/0052011 A1 | 3/2005 | Best et al. |
| 2005/0116456 A1 * | 6/2005 | Tajima et al. ............... 280/751 |
| 2005/0218641 A1 * | 10/2005 | Tajima et al. ............... 280/752 |

* cited by examiner

*Primary Examiner*—Kiran B. Patel
(74) *Attorney, Agent, or Firm*—Brooks Kushman P.C.

(57) ABSTRACT

Energy-absorbing bolsters for an automotive instrument panel assembly are provided wherein each of the bolsters includes a network of thermoplastic cells having a plurality of interconnected sides for absorbing energy of an impact with a front panel by a passenger of the vehicle in an energy absorption area of the front panel. Each bolster includes a thermoplastic cover section including the front panel having a front outer surface and a rear inner surface. A thermoplastic rib structure lays immediately behind the rear inner surface of the front panel in the energy absorption area. A thermoplastic backing section includes a back panel having a rear outer surface and an inner surface and is secured to the cover section in containing relationship to the rib structure to form a hollow compartment for the rib structure in the energy absorption area. The rib structure includes a first set of energy-absorbing, thermoplastic, planar members which are integrally molded to and extend outwardly from one of the inner surfaces in a direction generally perpendicular to the inner surfaces to at least partially form the network.

6 Claims, 3 Drawing Sheets

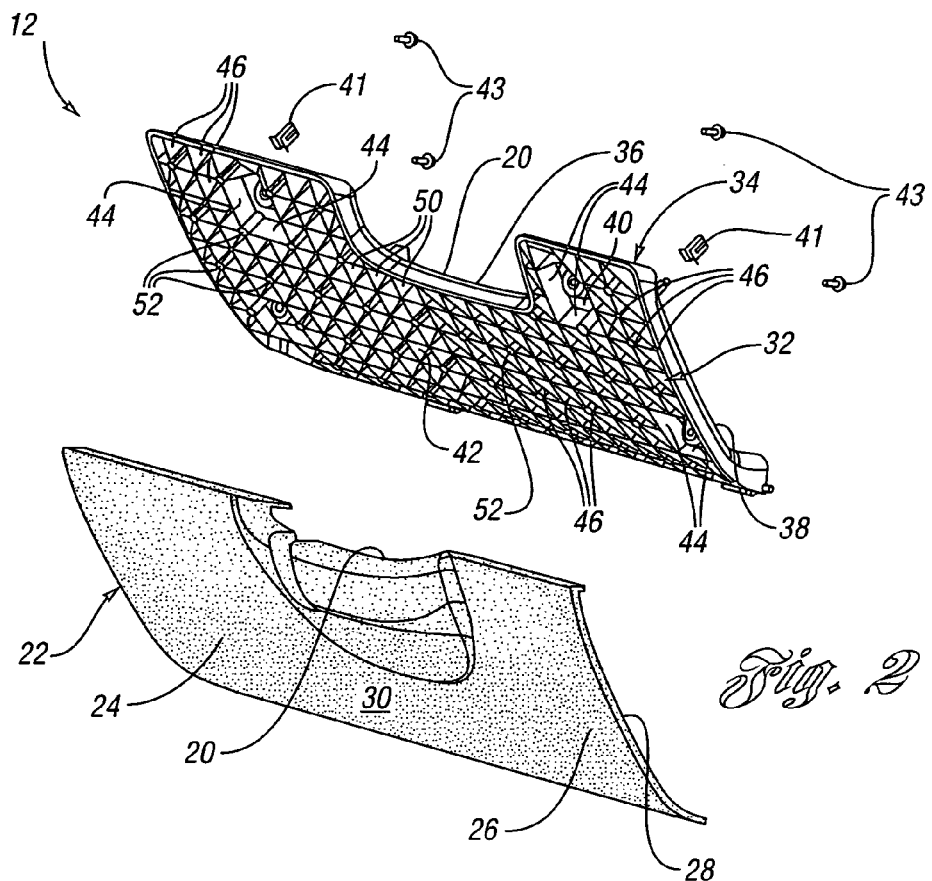
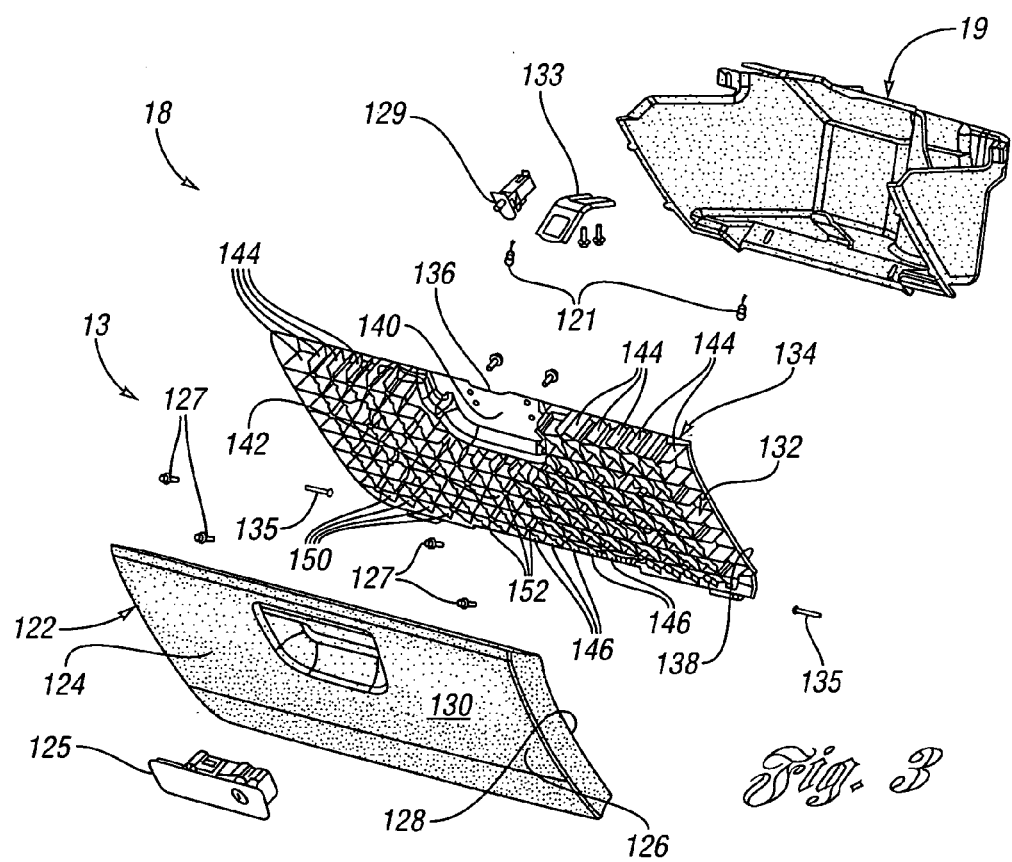

ENERGY-ABSORBING BOLSTER FOR AN AUTOMOTIVE INSTRUMENT PANEL ASSEMBLY

BACKGROUND OF THE INVENTION

1. Field of the Invention

This invention relates to energy-absorbing bolsters for automotive instrument panel assemblies.

2. Background Art

An instrument panel (i.e., IP), also called crash pad or dashboard, is an interior part of an automobile that is located below the windshield. An instrument panel accommodates components providing driver and passengers with various information for safe driving, and convenience. The instrument panel integrates meters including speedometer and fuel meter as well as convenience devices such as air bag controls, glove box and radio. Many instrument panel assemblies have plastic components. Factors to be taken account when selecting plastic materials are heat resistance, impact resistance, processability, and dimensional stability. Poor heat resistance might cause the IP to sag by itself and the poor dimensional stability might cause a bad installation or generate noises and vibrations with other side parts.

The lower portions of such instrument panel structures serve as occupant knee and ankle restraints, commonly referred to as "knee bolsters", to absorb the impact shock of knees and ankles which occurs upon sudden deceleration of the vehicle caused by a collision or high level braking.

U.S. Pat. No. 5,326,130 discloses a vehicle instrument panel structure for extending transversely across the width of a vehicle interior forwardly of a vehicle occupant seat. The instrument panel structure includes an upstanding backing plate having a layer of foam material thereon covered by a decorative covering. The backing plate is a unitary member formed of a plastic material. A pair of spaced-apart elongated horizontally extending box-like protuberances are provided on one portion of the lower section of the backing plate in the path of occupant knee travel which may occur during sudden deceleration of the vehicle.

U.S. Pat. No. 5,431,442 discloses a passenger restraint structure for an automotive vehicle having a glove box which has at least one face that is able to be opened to a passenger compartment and is attached to an instrument panel so as to be opposed to the knees of a passenger. The glove box has an intermediate wall connecting a front wall and a rear wall of the glove box. A stiffener member is located between the glove box and a part of a vehicle body and is stiffer than the glove box for crash energy generated between the passenger and the vehicle body in the running direction of the vehicle. Upon impact, the weaker intermediate wall of the glove box is compressed, deformed and broken, thereby absorbing the crash energy.

U.S. Pat. No. 5,311,960 discloses a multifunctional structural cross vehicular beam assembly extending across substantially the entire width of the vehicular compartment between a cowl and a instrument panel. The beam supports the steering column of the vehicle so that the first bending mode frequency of the combination of the steering wheel and the beam is greater than the first bending mode frequency of the body and is different from the idle excitation frequency of an engine employed in the vehicle. A plastic cover is connected to the beam for defining channels of an air distribution system for the passenger compartment.

U.S. Pat. No. 6,199,942 discloses an energy-absorbing assembly for decelerating an object that impacts the assembly. The assembly comprises at least one energy-absorbing member for accommodating deformation of the assembly. The assembly comprises a base and at least one energy-absorbing module associated therewith. The at least one energy-absorbing module is formed from a group consisting of structure (A) and structure (B). Structure (A) is a metal lattice which is supported by the thermoformed base. Structure (B) comprises of a plurality of recesses, each having a floor and a wall. Together, structures (A) and (B) and combinations thereof afford a user-determinable resistance to impact.

U.S. Pat. No. 6,474,687 discloses a one-piece knee bolster for a motor vehicle including a knee bolster cover adapted to mount to a vehicle structure in an interior of a motor vehicle and at least one hollow reinforcing channel member extending along the knee bolster cover to reinforce the knee bolster cover.

U.S. Pat. No. 6,464,255 discloses a knee bolster airbag system to dissipate impact energy during an impact of a vehicle in which the system is disposed. The system includes a base which has a first surface disposed toward a vehicle compartment of the vehicle, and a cover having an inner surface attached adjacent the first surface of the base to define a cavity. The cover further has opposite first and second edges, wherein the first edge pivotally attaches the cover to the base about an axis to hinge the first edge of the cover to the base. The system further includes an airbag housing member adjacent which an airbag and a gas source are disposed. The system further includes a tether connected to the base and the cover. The tether allows a predetermined displacement of the second edge away from the base when the airbag is in a deployed state.

U.S. Pat. No. 6,869,123 discloses an instrument panel assembly including an elongate beam structure and a plurality of thermoplastic energy absorbers coupled to the beam structure. The instrument panel assembly also includes at least one knee bolster positioned adjacent the plurality of thermoplastic energy absorbers and an instrument panel.

U.S. Pat. No. 6,797,089 discloses an energy management system having a substrate and a crash pad that are vibration welded together. A method for vibration welding first and second parts made of materials that are incompatible with being vibration welded includes prior to vibration welding the first and second parts, adhering to a surface of at least the first part of a layer of material that is compatible with being vibration welded to the second part.

In the manufacture of vehicles, such as passenger cars and trucks, there are many safety standards that must be met by the vehicles to reduce the likelihood and/or severity of injury to occupants during an accident. For example, in the United States the safety standard FMVSS 208 deals with the risk of knee injury arising from contacting the vehicle instrument panel during a frontal crash. In order to meet the safety standard, portions of an instrument panel assembly are required to absorb at least some of the energy of an impact by the knees of the front seat occupants during a crash. A portion of the instrument panel that is configured to sustain an impact from the knees of a front seat occupant during a crash is called a bolster. This is the portion of the instrument panel below the belt line.

Government tests are conducted on vehicles to determine if they meet the safety standard, based on the statistically median-sized male occupant. The median size is a statistically determined size whereby 50 percent of the population is larger and 50 percent of the population is smaller.

In some vehicles, the problem of meeting this safety standard is complicated by the fact that the vehicle's glove box is positioned in the same area that is expected to be impacted by the knees of the median-sized passenger during a crash.

The glove box door is typically made from a polymeric material and is injection molded. The injection molding process can itself negatively affect the strength of the plastic material. Thus, the glove box door is typically not considered to be capable of sustaining a substantial portion of the load that results from an impact by the passenger's knees during a crash. Although injection molded pieces have good appearance characteristics, they do not usually have much strength and thus require additional strengthening such as metal plates or wide contact areas with brackets.

U.S. Patent Application Publication No. 2005/0052011 discloses an instrument panel subassembly for use in an instrument panel assembly in a motor vehicle. The subassembly includes first and second generally C-shaped energy absorption brackets. The brackets have an aft facing C-section and upper and lower mounting ends. The brackets include an attachment mechanism for attaching the brackets to a vehicle structural member. The subassembly further includes a glove box door having an aft surface and a forward surface, and a bin. The glove box door includes a hinge mechanism for providing hinged movement of the glove box door relative to the first and second brackets between open and closed positions. The bin is within the C-section of the brackets when the glove box door is in a hingedly closed position.

Vehicle safety standards also require special design parameters relating to the steering column of the vehicle. The steering column must be designed to move in an axial direction if the chest of the driver contacts the steering wheel in the course of a crash. Most steering columns are designed to collapse in an axial direction and the steering column is located and designed with the collapsing structure being calculated on the basis that the steering column is not impacted by other structures within the vehicle. A further aspect of the impact safety design of the vehicle is that the driver's knees will contact the bolster area with one knee on either lateral side of the axis of the steering column. As the driver's knees contact the bolster area, the bolster may bend about a generally vertical plane. Bending of the bolster about a vertical plane may then result in some of the instrument panel structure, including the bolster itself, infringing on the space envelope allowed for the steering column structure. If there is any contact of this surrounding structure with the steering column, then the collapse characteristics of the steering column, in accordance with its design, will be changed due to contact from surrounding structure.

In order to deal with this problem, it is routine in automotive design to include a relatively strong structure, typically a metallic plate, which is attached to the instrument panel structure and which surrounds the steering column envelope. The metal plate may be attached to the bolster or to underlying instrument panel structure. The meal plate is more properly called a steering column protector and is sometimes referred to colloquially as a knee splitter. The function of the structure is to keep the driver's knees spread apart so that neither the knees, the bolster nor any other surrounding structure infringes on the steering column envelope. This ensures that the steering column can collapse in accordance with its designed function.

Most vehicles today have structure built in to help absorb the energy generated by the impact of the driver's knees on the bolster. Typically, most vehicles have energy absorption brackets mounted laterally to either side of the steering column axis outside the steering column envelope. Energy is dissipated as the driver's knees contact the bolster pushing the bolster against the energy absorption brackets and some energy is dissipated by the energy absorption bracket. The energy absorption brackets are located to provide protection to the median sized person as constrained by the vehicle geometry.

In the existing design envelope, bolsters applied to the steering wheel area of cars are relatively complicated structures comprising a bolster as well as the steering column protector. The bolster generally is a surface of the instrument panel that would otherwise be available for viewing by a vehicle occupant and thus the bolster area must meet certain appearance characteristics. Heretofore, bolsters have been made from injection-molded parts, which have good appearance characteristics on the surface which is visible within the vehicle. However, due to the very nature of injection molding, parts made by the injection molding process often have less strength that might otherwise be available from the plastic resins used in the injection molding process. In such designs, an injection-molded bolster is created which has suitable appearance characteristics and the bolster is strengthened by a metallic plate. The steering column protector serves the function of protecting the steering column with the assumption that the driver's knees will be located substantially directly aft of the energy absorption brackets.

While this is a complicated and expensive structure to manufacture, there is also the question of what happens if the driver's knees are not located directly aft of the energy absorption structure. This may be as a result of the driver not meeting the 50 percentile adult male physical-size and the drivers seating position may locate the knees at some point other than directly aft of the energy absorption brackets.

U.S. Patent Application Publication 2005/0052010 discloses a bolster for assembly to an instrument panel assembly of an automotive vehicle. The vehicle has a steering column with a steering column axis and at least two energy-absorbing brackets located laterally to either side of the steering column axis. The bolster comprises a unitary structure having a generally forward wall and a generally aft wall. The forward wall has a forward wall, forward surface. The forward wall, forward surface includes first and second bolster transfer surfaces for transferring forces from the bolster to the energy-absorbing brackets. The bolster further comprises a plurality of generally laterally extending rib structures. The rib structures extend from adjacent the first bolster transfer surface to adjacent the second bolster transfer surface. The plurality of generally laterally extending ribs structures have sufficient strength to inhibit bending of the bolster about a vertical plane when struck by a driver's knees at a point or points that are not directly aft of the bolster transfer surfaces, when the force is equal to or less than an amount specified by a test standard.

One problem associated with most, if not all of the above-noted structures, is that these structures have relatively large mass, complexity and high cost.

SUMMARY OF THE INVENTION

An object of the present invention is to provide an energy-absorbing bolster for an automotive instrument panel assembly wherein the bolster is FMVSS 208 compliant, is relatively low cost and simple to make, and has a relatively low mass.

In carrying out the above object and other objects of the present invention, an energy-absorbing bolster for an automotive instrument panel assembly is provided. The bolster includes a thermoplastic cover section having a front panel with a front outer surface and a rear inner surface. The front panel has an energy absorption area. The bolster also includes a thermoplastic rib structure which lays immediately behind the rear inner surface of the front panel in the energy absorption area. The thermoplastic backing section includes a back panel having a rear outer surface and an inner surface which is secured to the cover section in containing relationship to the rib structure to form a hollow compartment for the rib structure in the energy absorption area. The rib structure includes a first set of energy-absorbing, thermoplastic, planar members which are integrally molded to and extend outwardly from one of the inner surfaces in a direction generally perpendicular to the inner surfaces to at least partially form a network of thermoplastic cells. The cells have a plurality of interconnected sides for absorbing energy of an impact with the front panel by a passenger of the vehicle in the energy absorption area.

The bolster may include a second set of energy-absorbing, thermoplastic, planar members which are integrally molded to and extend outwardly from one of the inner surfaces in a direction generally perpendicular to the inner surfaces within at least some of the cells.

The bolster may include a set of energy-absorbing, thermoplastic posts which are integrally molded to and extend outwardly from one of the inner surfaces in a direction generally perpendicular to the inner surfaces to form corners of at least some of the cells.

The back panel may undulate to form a plurality of peak and valley portions where the set of energy-absorbing thermoplastic planar members are disposed in the valley portions. The peak and valley portions and the planar members form the network of cells.

The peak and valley portions of the back panel may form a plurality of spaced, horizontal, strengthening ribs which continuously extend across substantially the entire width of the back panel. The thermoplastic planar members extend in a direction generally perpendicular to the strengthening ribs to form the network of cells.

The number, spacing and size of the cells may be predetermined based on impact requirements.

Further in carrying out the above object and other objects of the present invention, an energy-absorbing bolster for an automotive glove box subassembly is provided. The bolster includes a thermoplastic cover section having a front panel with a front outer surface and a rear inner surface. The front panel has an energy absorption area. The bolster also includes a thermoplastic rib structure which lays immediately behind the rear inner surface of the front panel in the energy absorption area. The bolster also includes a thermoplastic backing section having a back panel with a rear outer surface and an inner surface which is secured to the cover section in containing relationship to the rib structure to form a hollow compartment for the rib structure in the energy absorption area. The rib structure includes a first set of energy-absorbing, thermoplastic, planar members which are integrally molded to and extend outwardly from one of the inner surfaces in a direction generally perpendicular to the inner surfaces to at least partially form a network of thermoplastic cells. The cells have a plurality of interconnected sides for absorbing energy of an impact with the front panel by a passenger of the vehicle in the energy absorption area.

The bolster may include a second set of energy-absorbing, thermoplastic, planar members which are integrally molded to and extend outwardly from one of the inner surfaces in a direction generally perpendicular to the inner surfaces within at least some of the cells.

The bolster may include a set of energy-absorbing, thermoplastic posts which are integrally molded to and extend outwardly from one of the inner surfaces in a direction generally perpendicular to the inner surfaces to form corners of at least some of the cells.

The back panel may undulate to form a plurality of peak and valley portions. The set of energy-absorbing thermoplastic planar members may be disposed in the valley portions so that the peak and valley portions and the planar members form the network of cells.

The peak and valley portions of the back panel may form a plurality of spaced, horizontal, strengthening ribs which continuously extend across substantially the entire width of the back panel. The thermoplastic planar members may extend in a direction generally perpendicular to the strengthening ribs to form the network of cells.

The number, spacing and size of the cells may be predetermined based on impact requirements.

Still further in carrying out the above object and other objects of the present invention, an energy-absorbing bolster having an automotive steering column cut out is provided. The bolster includes a thermoplastic cover section having a front panel with a front outer surface and a rear inner surface. The front panel has an energy absorption area. The bolster also includes a thermoplastic rib structure which lays immediately behind the rear inner surface of the front panel in the energy absorption area and a thermoplastic backing section. The backing section has a back panel with a rear outer surface and an inner surface and is secured to the cover section in containing relationship to the rib structure to form a steering column cut out and to form a hollow compartment for the rib structure in the energy absorption area. The rib structure has a first set of energy-absorbing, thermoplastic, planar members which are integrally molded to and extend outwardly from one of the inner surfaces in a direction generally perpendicular to the inner surfaces to at least partially form a network of thermoplastic cells. The cells have a plurality of interconnected sides for absorbing energy of an impact with the front panel by a passenger of the vehicle in the energy absorption area.

The bolster may include a second set of energy-absorbing, thermoplastic, planar members which are integrally molded to and extend outwardly from one of the inner surfaces in a direction generally perpendicular to the inner surfaces within at least some of the cells.

The bolster may include a set of energy-absorbing, thermoplastic posts which are integrally molded to and extend outwardly from one of the inner surfaces in a direction generally perpendicular to the inner surfaces to form corners of at least some of the cells.

The back panel may undulate to form a plurality of peak and valley portions. The set of energy-absorbing thermoplastic planar members may be disposed in the valley portions so that the peak and valley portions and the planar members form the network of cells.

The peak and valley portions of the back panel may form a plurality of spaced, horizontal, strengthening ribs which continuously extend across substantially the entire width of the back panel. The thermoplastic planar members may extend in a direction generally perpendicular to the strengthening ribs to form the network of cells.

The number, spacing and size of the cells are predetermined based on impact requirements.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is an exploded perspective view of a knee bolster constructed in accordance with an embodiment of the invention for use about a steering column assembly;

FIG. 3 is an exploded perspective view of a glove box assembly including a glove box door or bolster constructed in accordance with one embodiment of the present invention;

DETAILED DESCRIPTION OF THE PREFERRED EMBODIMENT(S)

Figure 1:
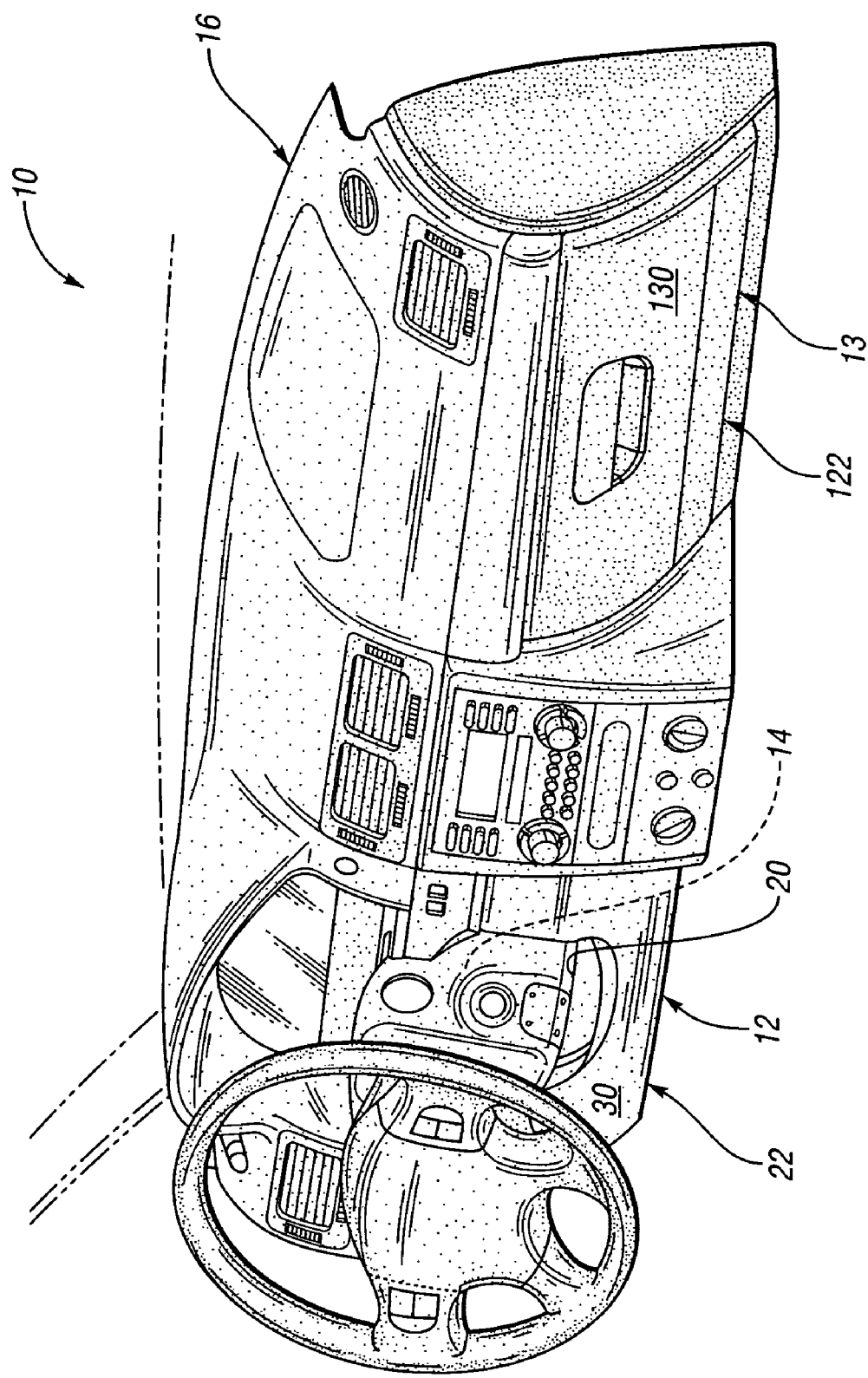
FIG. 1 is an environmental view of a automotive instrument panel assembly in which energy-absorbing bolsters constructed in accordance with embodiments of the invention can be utilized.

FIG. 1 illustrates a portion of an automotive vehicle 10 in which energy-absorbing knee bolsters generally indicated at 12 and 13, for an automotive instrument panel assembly, generally indicated at 16, are provided. The knee blocker or bolster 12 forms part of a steering column cover assembly and is disposed adjacent a steering column 14.

The glove box door or bolster 13 forms part of a glove box assembly, generally indicated at 18 in FIG. 3, which also includes a plastic glove box bin 19.

During an impact of the vehicle 10, the knee bolster 12 and the bolster 13 absorb energy of an impact by a passenger of the vehicle 10 in energy-absorption areas 30 and 130, respectively, as described in greater detail hereinbelow.

Referring now to FIG. 2, the energy-absorbing bolster 12 has a steering column cut out 20. The bolster 12 includes a thermoplastic cover section, generally indicated at 22, including a front panel 24 having a front outer surface 26 and a rear inner surface 28. The front panel has the energy absorption area 30.

The bolster 12 also includes a thermoplastic rib structure, generally indicated at 32, laying immediately behind the rear inner surface 28 of the front panel 24 in the energy absorption area 30.

The bolster 12 further includes a thermoplastic backing section, generally indicated at 34, including a back panel 36 having a rear outer surface 38 and an inner surface 40. The backing section 26 is secured to the cover section 22 in containing relationship to the rib structure 32 to form a hollow compartment 42 for the rib structure 22 in the energy absorption area 30. The rib structure 32 includes a first set of energy-absorbing, thermoplastic, planar members 44 which are integrally molded to and extend outwardly from the inner surface 40 in a direction generally perpendicular to the inner surfaces 28 and 40 to at least partially form a network of thermoplastic cells 46 having a plurality of interconnected sides for absorbing energy of an impact with the front panel 24 by a passenger of the vehicle in the energy absorption area 30.

The bolster 12 further includes a second set of energy-absorbing, thermoplastic, planar, triangularly-shaped members 50 which are integrally molded to and extend outwardly from the inner surface 40 in a direction generally perpendicular to the inner surfaces 28 and 40 within at least some of the cells 46.

The bolster 12 still further includes a set of energy-absorbing, thermoplastic posts 52 which are integrally molded to and extend outwardly from the inner surface 40 in a direction generally perpendicular to the inner surfaces 28 and 40 to form corners of at least some of the cells 46.

FIG. 2 also illustrates a number of u-shaped clips 41 and screws 43 for securing the bolster 12 to the rest of the cover assembly.

Figure 4:
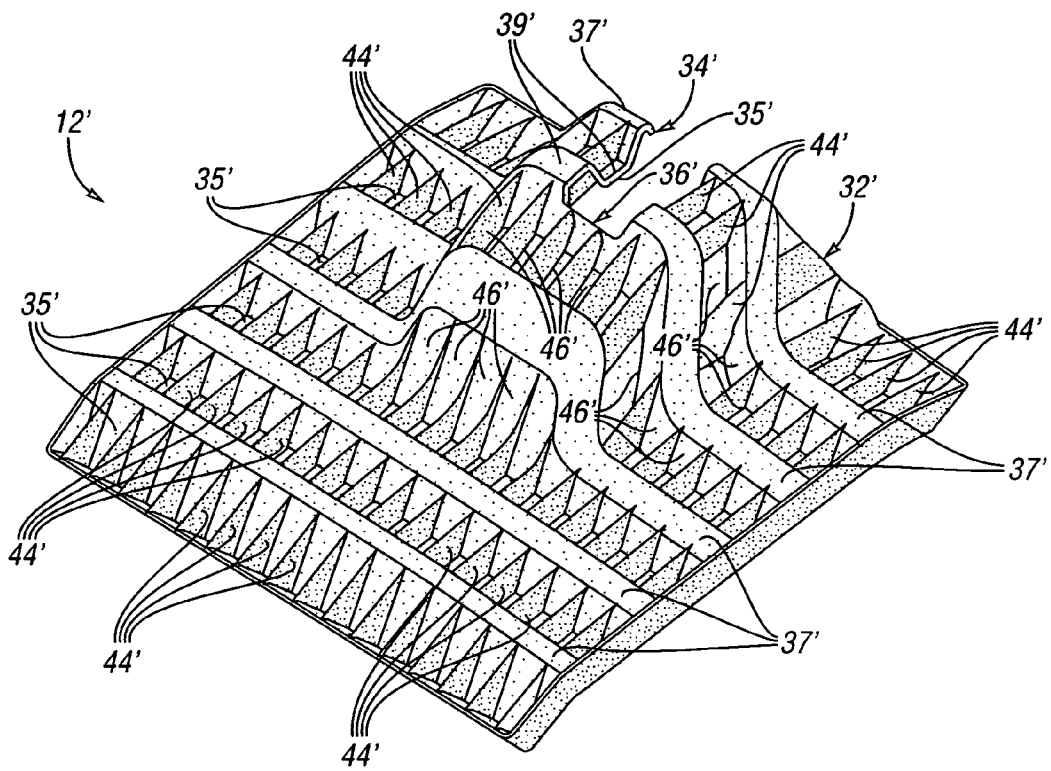
FIG. 4 is a perspective view of an inner steering column cover constructed in accordance with one embodiment of the present invention and having a molded in rib structure.

Referring now to FIG. 4, there is illustrated a second embodiment of an energy-absorbing bolster to be positioned adjacent the steering column 14. A cover section for the bolster is not shown for simplicity. The bolster is generally indicated at 12'. Parts of the second embodiment which have the same or similar function as those parts of the first embodiment have the same reference number but a prime designation for purposes of simplicity.

Unlike the back panel 36 of the embodiment of FIG. 2, the back panel 36' is undulating to form a plurality of peak and valley portions 37' and 35', respectively. The set of energy-absorbing thermoplastic planar members 44' are disposed in the valley portions 35'. The peak and valley portions, 37' and 35', respectively, and the planar members 44' form the network of cells 46'.

The peak and valley portions 37' and 35', respectively, of the back panel 36' form a plurality of spaced, horizontal, strengthening ribs 39' which continuously extend across substantially the entire width of the back panel 36'. The thermoplastic planar members 44' extend in a direction generally perpendicular to the strengthening ribs 39' to form the network of cells 46'.

Referring again to FIG. 3, the glove box bolster 13 is similar in form and function to the knee blocker or bolster 12 of FIG. 2. Therefore, the parts of the bolster 13 which have the same or similar structure and/or function as the parts of the bolster 12 have "100" added to their respective reference numbers for simplicity.

The glove box assembly 18 also includes a latch assembly 125, screws 127, a glove box lamp assembly 129, a close bumpers 121, a glove box striker 133 including screws and glove box pins 135 to complete the glove box assembly 18.

Figure 5:
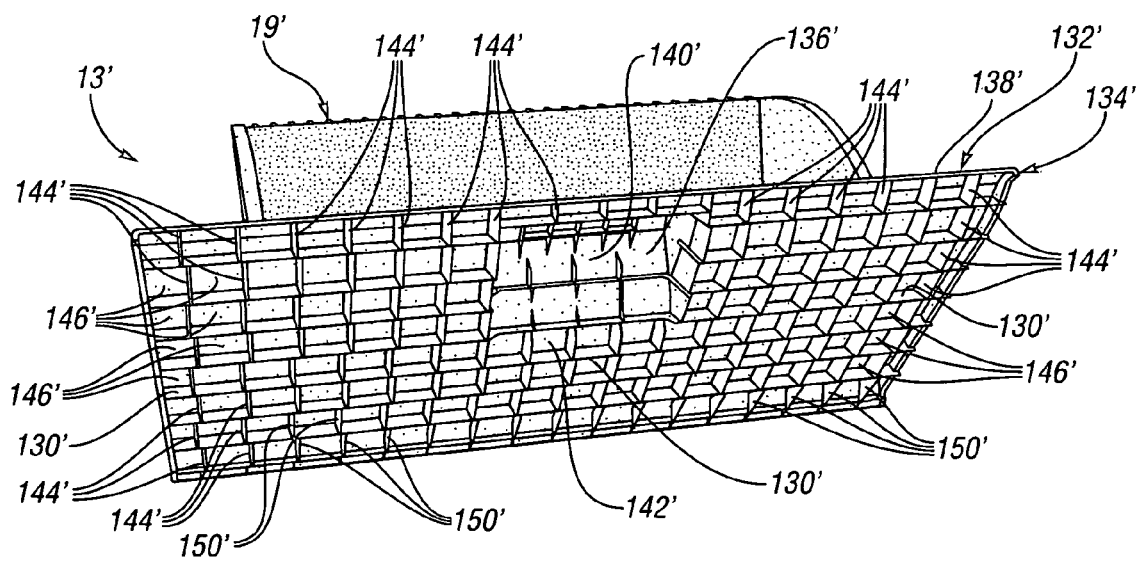
FIG. 5 is a front perspective view of an inner glove box door and attached glove box bin constructed in accordance with one embodiment of the present invention and having a molded in rib structure.

Referring now to FIG. 5, there is illustrated a second embodiment of a glove box bolster, generally indicated at 13', wherein parts of the bolster 13' which have the same or similar structure and/or function as the parts of the bolster 13 are indicated by the same reference number but with a prime designation. A cover section similar to the cover section 122 of FIG. 3, is omitted for simplicity.

The number, spacing and size of the cells 46, 46', 146 and 146' are predetermined based on impact requirements such as safety standard FMVSS 208.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An energy-absorbing bolster for an automotive instrument panel assembly, the bolster comprising:

a thermoplastic cover section including a front panel having a front outer surface and a rear inner surface, the front panel having an energy absorption area;

a thermoplastic rib structure laying immediately behind the rear inner surface of the front panel in the energy absorption area; and a thermoplastic backing section including a back panel having a rear outer surface and an inner surface and being secured to the cover section in containing relationship to the rib structure to form a hollow compartment for the rib structure in the energy absorption area wherein the rib structure includes a first set of energy-absorbing, thermoplastic, planar members which are integrally molded to and extend outwardly from one of the inner surfaces in a direction generally perpendicular to the inner surfaces to at least partially form a network of thermoplastic cells having a plurality of interconnected sides for absorbing energy of an impact with the front panel by a passenger of the vehicle in the energy absorption area.

2. The bolster as claimed in claim 1, further comprising a second set of energy-absorbing, thermoplastic, planar members which are integrally molded to and extend outwardly from one of the inner surfaces in a direction generally perpendicular to the inner surfaces within at least some of the cells.

3. The bolster as claimed in claim 1, further comprising a set of energy-absorbing, thermoplastic posts which are integrally molded to and extend outwardly from one of the inner surfaces in a direction generally perpendicular to the inner surfaces to form corners of at least some of the cells.

4. The bolster as claimed in claim 1, wherein the back panel is undulating to form a plurality of peak and valley portions and wherein the set of energy-absorbing thermoplastic planar members are disposed in the valley portions and wherein the peak and valley portions and the planar members form the network of cells.

5. The bolster as claimed in claim 4, wherein the peak and valley portions of the back panel form a plurality of spaced, horizontal, strengthening ribs which continuously extend across substantially the entire width of the back panel and wherein the thermoplastic planar members extend in a direction generally perpendicular to the strengthening ribs to form the network of cells.

6. The bolster as claimed in claim 1, wherein number, spacing and size of the cells are predetermined based on impact requirements.

* * * * *

UNITED STATES PATENT AND TRADEMARK OFFICE
CERTIFICATE OF CORRECTION

| | | |
|---|---|---|
| PATENT NO. | : 7,201,434 B1 | Page 1 of 1 |
| APPLICATION NO. | : 11/267222 | |
| DATED | : April 10, 2007 | |
| INVENTOR(S) | : R. Michalak et al. | |

It is certified that error appears in the above-identified patent and that said Letters Patent is hereby corrected as shown below:

Column 1, line 20, insert --in to-- before "account"

Column 3, line 55, "meal" should be --metal--

Signed and Sealed this

Thirtieth Day of October, 2007

JON W. DUDAS
*Director of the United States Patent and Trademark Office*